(12) United States Patent
Holz

(10) Patent No.: US 11,897,431 B2
(45) Date of Patent: Feb. 13, 2024

(54) ROOF RACK COUPLER

(71) Applicant: HOLZ INDUSTRIES PTY LTD, East Brisbane (AU)

(72) Inventor: Bill Holz, East Brisbane (AU)

(73) Assignee: HOLZ INDUSTRIES PTY LTD, East Brisbane (AU)

( * ) Notice: Subject to any disclaimer, the term of this patent is extended or adjusted under 35 U.S.C. 154(b) by 147 days.

(21) Appl. No.: 17/612,629

(22) PCT Filed: Jun. 4, 2020

(86) PCT No.: PCT/AU2020/050565
§ 371 (c)(1),
(2) Date: Nov. 19, 2021

(87) PCT Pub. No.: WO2020/243780
PCT Pub. Date: Dec. 10, 2020

(65) Prior Publication Data
US 2022/0242327 A1  Aug. 4, 2022

(30) Foreign Application Priority Data

Jun. 4, 2019 (AU) .............................. 2019901926

(51) Int. Cl.
*B60R 9/058* (2006.01)

(52) U.S. Cl.
CPC .................... *B60R 9/058* (2013.01)

(58) Field of Classification Search
CPC . B60R 9/058; B60R 9/048; B60R 2011/0059; B60R 2011/0043
See application file for complete search history.

(56) References Cited

U.S. PATENT DOCUMENTS

| 8,393,508 | B2* | 3/2013 | Sautter | B60R 9/045 |
| | | | | 224/570 |
| 8,651,349 | B2* | 2/2014 | Meissner | B60R 9/055 |
| | | | | 224/570 |
| 9,751,468 | B1 | 9/2017 | Badillo | |
| 10,543,771 | B2* | 1/2020 | Sautter | B60P 3/34 |
| 10,676,037 | B2* | 6/2020 | Schactman | F16B 2/12 |

(Continued)

FOREIGN PATENT DOCUMENTS

| AU | 2015101089 A4 | 9/2015 |
| DE | 20 2016 103 60 U1 | 10/2016 |
| JP | H08-142767 A | 6/1996 |

OTHER PUBLICATIONS

International Search Report from corresponding International Application No. PCT/AU2020/050565, dated Aug. 28, 2020, 5 pages.

(Continued)

*Primary Examiner* — Brian D Nash
(74) *Attorney, Agent, or Firm* — Tucker Ellis LLP

(57) ABSTRACT

Provided is a roof rack coupler for coupling an accessory to a roof rack. The coupler includes a roof rack member for fastening to the generic roof rack bracket. The coupler further includes an accessory member, typically releasably fastenable to the accessory, for engaging with the roof rack member. Securing means is provided for securing the accessory member to the roof rack member. The accessory member may be dropped within and lifted out of the roof rack member to facilitate rapid assembly and disassembly.

17 Claims, 3 Drawing Sheets

(56) References Cited

U.S. PATENT DOCUMENTS

| | | | |
|---|---|---|---|
| 2005/0061583 A1 | 3/2005 | Stevens | |
| 2008/0034561 A1* | 2/2008 | Emmerling | B60R 9/055 24/514 |
| 2013/0292436 A1* | 11/2013 | Hubbard | B60R 9/045 224/321 |
| 2016/0184978 A1* | 6/2016 | Roesch | B25B 7/123 269/228 |
| 2019/0291653 A1* | 9/2019 | Brochier | B60R 9/048 |
| 2020/0139901 A1* | 5/2020 | Kowal | B60R 13/04 |
| 2020/0207279 A1* | 7/2020 | Kulick | B60R 11/00 |
| 2021/0046881 A1* | 2/2021 | Vidar | B60R 9/058 |
| 2021/0114528 A1* | 4/2021 | Nevener | B60R 9/048 |

OTHER PUBLICATIONS

Screen capture from YouTube video clip entitled "Smart Touring Systems—Quick Fit Bracket," [retrieved from the Internet on Nov. 19, 2021], <URL: https://www.youtube.com/watch?v=kwcHzECKpqA>, 1 page.

"Quick Fit Bracket," STS Smart Touring Systems website, [retrieved from the Internet on Nov. 19, 2021], <URL: http://www.smarttouringsystems.com.au/store/c4/Quick_Fit_Brackets.html, 3 pages, and http://www.smarttouringsystems.com.au>, 9 pages.

Allen, Mark, "Quick Fit Bracket: product test", Whichcar—4×4 Australia Gear, [retrieved from the Internet pn Nov. 19, 2021], Oct. 15, 2017, <URL: https://www.whichcar.com.au/gear/quick-fit-bracket-video-product-test>, 5 pages.

Screen capture from YouTube video clip entitled "Racins Adventures—Ironman 4×4 Quick Release Awning Bracket—Solo set up tips," [retrieved from the Internet on Nov. 19, 2021], <URL: https://www.youtube.com/watch?v=S8LwQjdJRhQ>, 1 page.

Screen capture from YouTube video clip entitled "Ironman 4×4 Awning Bracket," [retrieved from the Internet on Nov. 19, 2021], <URL: https://www.youtube.com/watch?v=2KJTTXZ21Oo>, 1 page.

"Awning Quick Release Mounting Brackets," Ironman 4×4 America website, [retrieved from the Internet on Nov. 19, 2021], <URL:https://ironman4x4america.com/awning-quick-release-mounting-brackets/>, 6 pages.

European Search Report of corresponding European Application No. 20818198.2, dated May 19, 2023, 7 pages.

* cited by examiner

ROOF RACK COUPLER

RELATED APPLICATION DATA

This application is a national phase application of International Application No. PCT/AU2020/050565 filed Jun. 4, 2020 and published in the English language, which claims priority to AU 2019901926 filed Jun. 4, 2019, which are hereby incorporated herein by reference.

TECHNICAL FIELD

The present invention relates to a roof rack coupler for coupling an accessory to a roof rack. The coupler has particular, although not exclusive application, to coupling an awning, storage tube or other roof rack mounted accessory to the roof rack of a vehicle. It can also be used to couple these accessories to other structures such as walls for either use or for storage.

BACKGROUND

The reference to any prior art in this specification is not and should not be taken as an acknowledgement or any form of suggestion that the prior art forms part of the common general knowledge.

Retractable camping awnings, storage tubes or other roof rack mounted accessories are available for attachment to vehicles. In practice, the awnings or other roof rack mounted accessories are complex to remove and re-attach and are often undesirably left in place on the vehicle long after being used owing to the difficulty in removing them.

The preferred embodiment provides a fast and improved means for attaching and removing accessories to/from vehicles.

In addition, when the accessory is an awning and it is erected, supported on one side to the attached vehicle, it needs to be disassembled if the vehicle is to be used elsewhere.

The preferred embodiment provides a means for leaving the shelter erected whilst using the vehicle elsewhere.

SUMMARY OF THE INVENTION

According to one aspect of the present invention, there is provided a roof rack coupler for coupling an accessory to a roof rack, the coupler including:
   a roof rack member 106 for fastening to the roof rack;
   an accessory member 108 for engaging with the roof rack member; and
   securing means 110 for securing the accessory member 108 to the roof rack member 106.

A housing 202 may be provided for an optional lock 400 and circlip 300 to lock all the components of the coupler together Preferably, the accessory member is releasably fastenable to the accessory. The accessory member 108 may be placed within and lifted out of the roof rack member 106 to facilitate rapid assembly and disassembly.

The accessory member 108 may be docked into the roof rack member 106. The accessory member may pivot when docked with the roof rack member 106. The accessory member 108 may include a pair of pivots on either side for engaging within respective recesses of the roof rack member 106. The accessory member 108 may include a body extending down between the pivots which forms a complementary fit with a space 118 defined in the roof rack member 106. The accessory member 108 may be substantially received within the roof rack member 106 to provide a streamlined coupler when remaining on the rook rack during transport.

The securing means may include a pin member 110 for tying the two members 108 and 106 together. The pin member 110 may feed through both the roof rack member 106 and the accessory member 108 and click into the roof rack member 106 opposite its entry point on 106. The pin member 110 may include a finger grip 120. The roof rack coupler may further include a lock circlip 300 to allow the fitment of a lock for locking the pin member 110 and members 106 and 108 together. The pin member 110 may be located at the base of the members 106 and 108 to facilitate reach.

The roof rack member 106 may define one or more slotted fastening holes for adjustable fastening to the roof rack. The roof rack coupler may further include fasteners for fastening the roof rack member 106 to the generic roof rack bracket and the accessory member 108 to the accessory 102. The fasteners may be threaded fasteners. The fasteners may include bolts, nuts and/or washers.

The roof rack coupler may further include a cover 500 for covering the roof rack member 106 when the accessory member 108 is not engaged. The cover may include pivots 502. The cover may include one or more holes 504 for receiving the pin member 110. The cover 500 may form a complementary fit with the roof rack member 106 for a neat streamlined finish when the accessory member 108 is not engaged.

The accessory may be an awning or storage tube or other type of roof rack mountable accessory. The roof rack coupler may further include another add on member 600 for clipping into the roof rack member 106. The other member 600 may be a housing for power supply or power socket for awning lighting.

The roof rack coupler may be aerodynamic in shape. Each member may have rounded edges. The members may be integrally formed. The members may be injection molded. The members may be formed from plastic.

According to another aspect of the present invention, where the attached accessory is an awning, due to the simple quick release of the awning, tent poles may be used for supporting the awning accessory. The accessory members 108 may then be uncoupled from the roof rack member 106 so that the awning may remain erected whilst the vehicle bearing the roof rack moves away from the freestanding erected awning.

According to another aspect of the present invention, there is provided a roof rack coupler for coupling an accessory to a roof rack, the coupler including:
   a roof rack member 106 for fastening to the roof rack;
   an accessory member 108 for engaging with the roof rack member and the accessory 102.
   securing means 110 for securing the accessory member 108 to the roof rack member 106.

A housing 202 may be provided for an optional lock 400 and circlip 300 to lock all the components of the coupler together According to another aspect of the present invention, there is provided a method for coupling an accessory to a roof rack, the method involving:
   fastening a roof rack member 106 to the generic roof rack bracket 104;
   fastening an accessory member 108 to the accessory 102; and
   securing the accessory member 108 to the roof rack member 106.

Preferably, the method involves engaging the accessory member 108 within the roof rack member 106.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
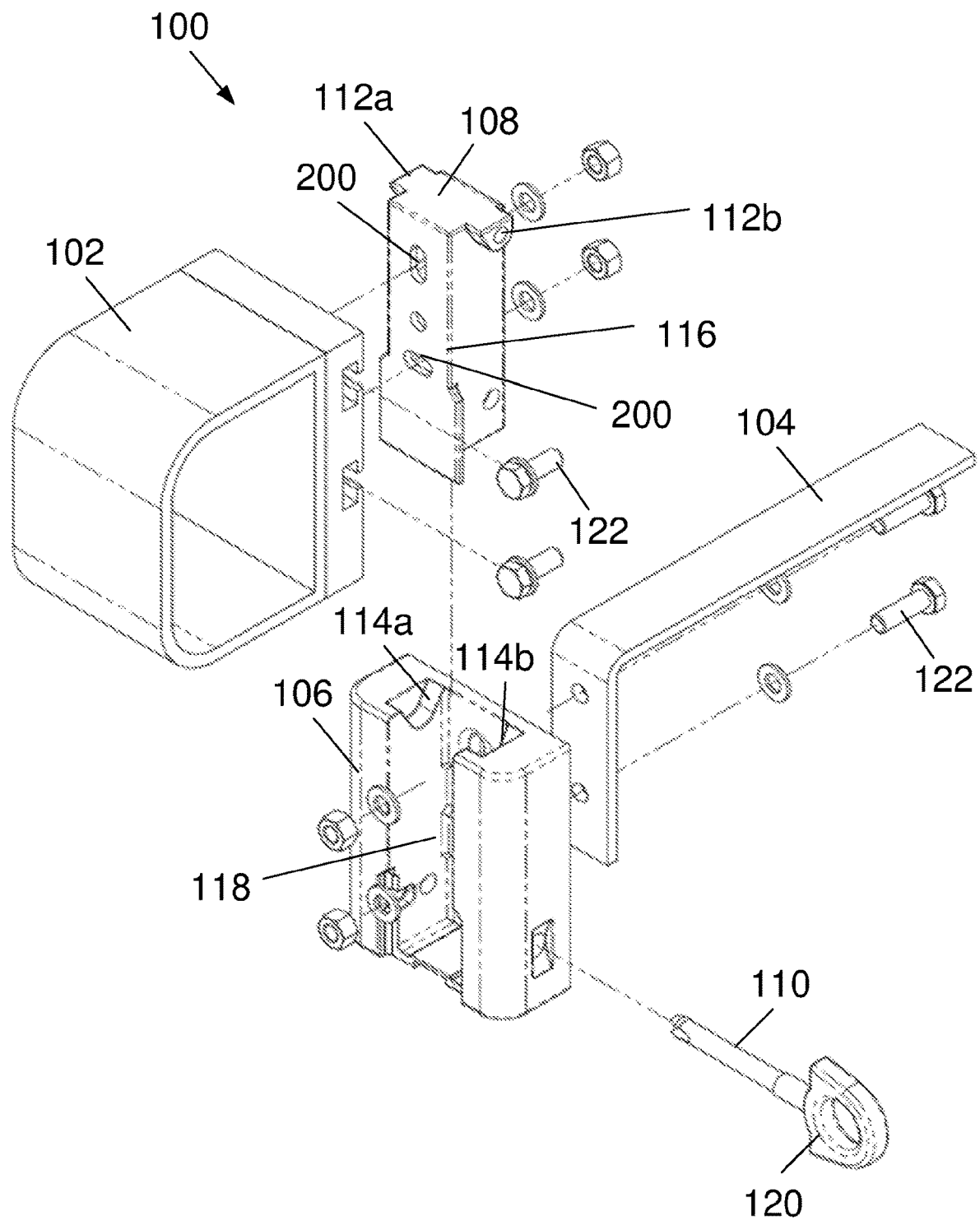
FIG. 1 is an exploded view showing a roof rack coupler in accordance with an embodiment of the present invention showing a generic accessory (in this case a generic awning)

According to an embodiment of the present invention, there is provided a roof rack coupler 100 for coupling any accessory 102 to a vehicle generic roof rack bracket 104 In the present case, for example, the accessory is a retractable awning. The roof rack coupler 100 includes a roof rack member 106 for releasably fastening to the generic roof rack bracket 104. An accessory member 108 is provided for releasably fastening to any generic accessory 102, and for engaging within the roof rack member 106. The accessory member 108 can be simply placed within and lifted out of the roof rack member 106 to facilitate rapid assembly and disassembly. Securing means, pin member 110, is provided for securing the accessory member 108 to the roof rack member 106.

The accessory member 108 includes a pair of pivots 112a, 112b on either side for engaging within respective recesses 114a, 114b of the roof rack member 106. The accessory member 108 includes a body 116 extending down between the pivots 112a, 112b and which forms a complementary fit within a central space 118 defined in the roof rack member 106. The accessory member 108 is substantially received within the roof rack member 106 to provide a streamlined roof rack coupler 100 when remaining on the generic roof rack bracket 104 during vehicle transport.

The accessory member 108 is docked in the roof of the roof rack member 106. Typically, the accessory member 108 is initially docked in the roof at an angle, and then let go to pivot downwardly on pivots 112a and 112b to an upright orientation when docked with the roof rack member 106, prior to being secured with securing means pin member 110.

The securing means pin member 110 includes a "click in" split pin sprung mechanism at one end received by the roof rack members 106, through accessory member 108 and back into roof rack member 106. The pin member 110 terminates in an endless finger grip 120 for receiving a finger during securing and releasing. The roof rack coupler 100 further includes threaded fasteners 122 for releasably fastening the roof rack member 106 to the generic roof rack bracket 104 and the accessory member 108 to the accessory 102. The fasteners 122 include bolts, nuts and washers.

Figure 2:
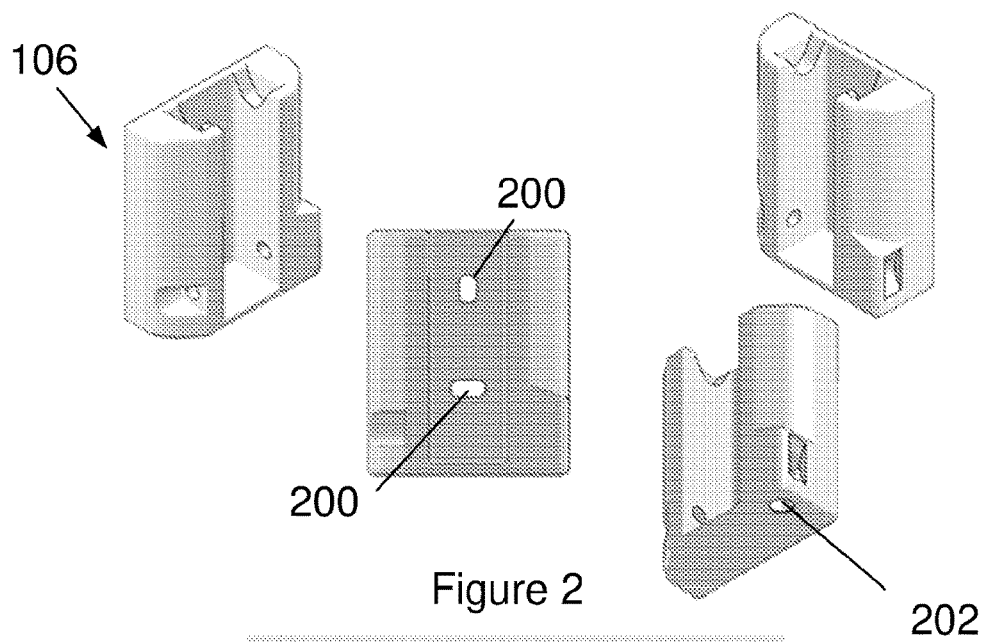
FIG. 2 shows various views of a roof rack member 106 of the roof rack coupler of FIG. 1.

Turning to FIG. 2, the roof rack member 106 defines slotted fastening holes 200 for adjustable positional fastening to suit the generic roof rack bracket 104. Likewise, the accessory member 108 defines slotted fastening holes 200 for adjustable positional fastening to suit the generic accessory 102. The lower horizontal slot in roof rack member 106 is slightly curved to facilitate rotation (about the upper hole) to the vertical position if the generic roof rack bracket 104 is not located vertically on the roof rack. The underside of the roof rack member 106 defines a lock hole 202 for receiving a circlip 300 (FIGS. 3 and 4) or other like adaptor for holding a lock, and lock 400.

Figure 3:
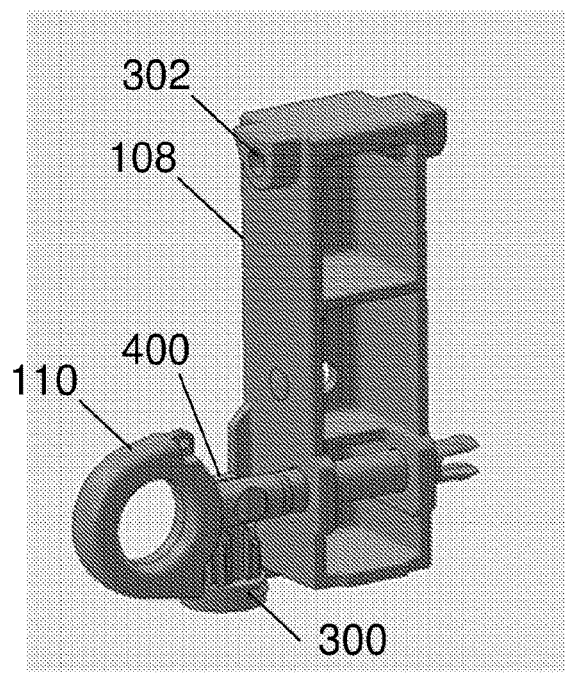
FIG. 3 is a perspective view showing the accessory member 108, the pin member 110 a lock circlip 300, the lock 400 of the roof rack coupler of FIG. 1.
Figure 4:
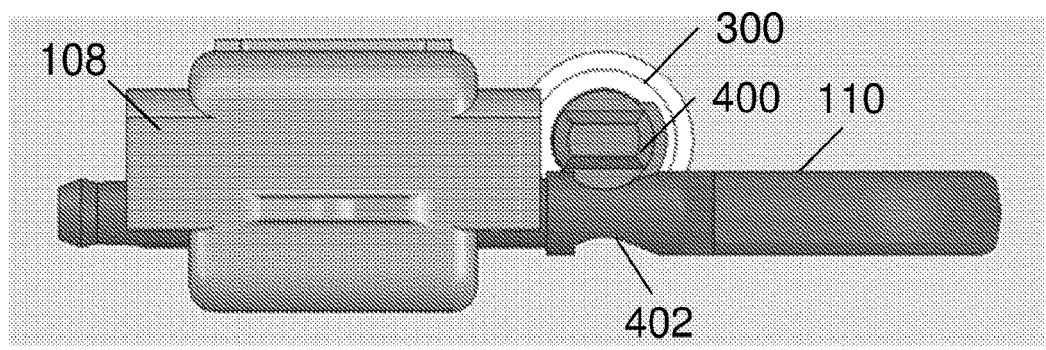
FIG. 4 is a top view showing the accessory member 108, the pin member 110 the lock circlip 300, the lock 400 of FIG. 3.

As can best be seen in FIGS. 3 and 4, the optional lock 400, held in place by circlip 300, locks the pin member 110 and members 106, 108 together using a key. The lock 400 is fixed in the roof rack member 106 by a circlip 300, and the lock's rotational tip on lock 400 engages in a recess 402 of the pin member 110 to prevent its withdrawal. The pin member 110 and lock 400 are located at the base of the members 106 and 108 to facilitate reach access. The accessory member 108 also includes a pair of anti-rattle dimples 302 on both sides.

Figure 5:
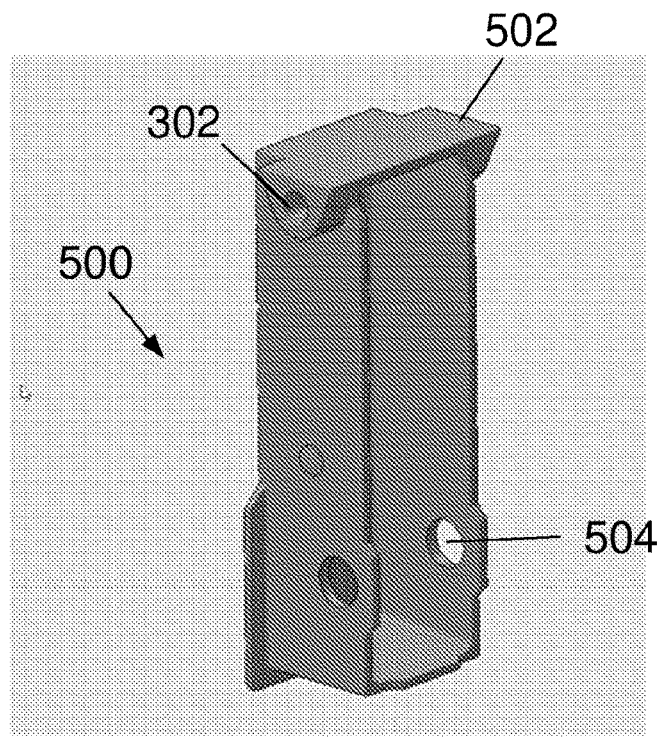
FIG. 5 is a perspective view of a cover 500 of the roof rack coupler of FIG. 1 used when accessories are not used in the roof rack coupler.

Turning to FIG. 5, the roof rack coupler 100 further includes a blank or cover 500 for covering and forming a complementary fit with the space 118 of the roof rack member 106 in place of the accessory member 108 when the accessory member 108 is removed. The cover 500 also includes two pivots 502 like the accessory member 108. The cover 500 also includes holes 504 for receiving the pin member 110.

Figure 6:
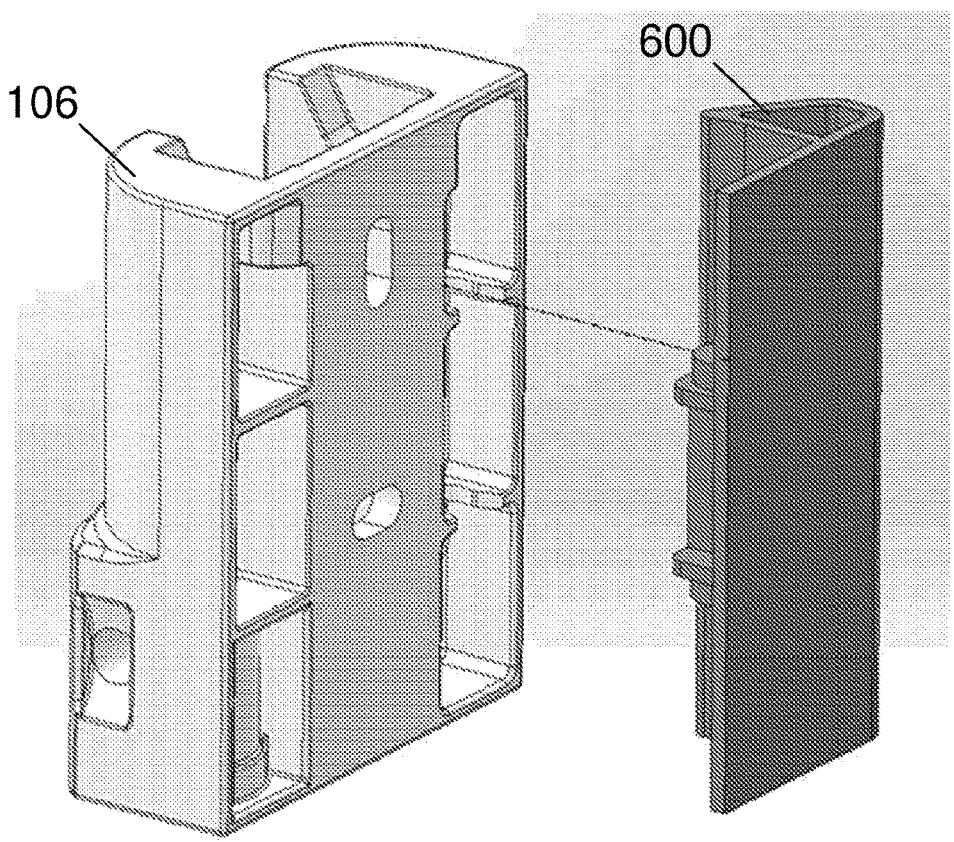
FIG. 6 is a perspective view of a generic member 600 of the roof rack coupler of FIG. 1 specifically showing the "click in" connection method that joins a generic member 600 to roof rack member 106.

Turning to FIG. 6, the roof rack coupler 100 further includes another generic accessory 600 for clipping or snap-fitting into the rear of the roof rack member 106. The generic accessory 600 may be a cover for a power supply or power point for powering lighting. The roof rack coupler 100 is aerodynamic in shape to minimize drag during transport. Each member 106, 108 has rounded edges and is integrally formed from plastic material by injection molding.

A method for coupling the accessory 102 to the generic roof rack bracket 104 using the coupler 100 is now briefly described.

The method involves fastening two or more roof rack members 106 to respective generic roof rack brackets 104 and fastening a matching number of accessory members 108 to ends of the awning or other accessory 102 using fasteners 122. Once done, this step need not be performed again for a given accessory. Note, multiple accessories with member 108 may be interchanged then located in member 106 at different times.

Next, the two accessory members pivots 112a and 112b of 108 are engaged in recesses 114a and 114b of the roof rack members 106, firstly at an angle to engage the pivots 112a and 112 b and then by pivoting down.

Next, respective securing means pin member 110 horizontally secures the accessory members 108 to the roof rack members 106. The lock 400 may lock the coupler 100 together so that the accessory 102 cannot be removed without a key. Typically, the engaging, securing and locking processes take about 10-15 seconds which is rapid.

The accessory 102, when it is an awning, can be erected with its free end mounted to tent poles to form a shelter adjacent the generic roof racks bracket 104. If in the event that the vehicle is required elsewhere, the two or more roof rack couplers can be unlocked and the unsecured awning and accessory members 108 can be lifted from the roof rack members 106 and instead mounted to tent poles so that the freestanding shelter can remain erected whilst using the vehicle bearing the generic roof rack bracket 104 travels elsewhere. Only marginal movement of the accessory members 108 and awning 102 is required to achieve this.

Further wall mounts, similar to roof rack members 106, can be mounted to a garage wall, for example, so that the accessory members 108 and accessory 102 can be safely and conveniently stored when removed from the generic roof racks brackets 104.

A person skilled in the art will appreciate that many embodiments and variations can be made without departing from the ambit of the present invention.

The accessory 102 can be an awning, a storage tube, vehicle recovery device (e.g. sand ladder) or another accessory that fits the roof rack coupler.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A roof rack coupler for coupling an accessory to a roof rack, the coupler including:
    a roof rack member for fastening to the roof rack;
    an accessory member for engaging with the roof rack member, the accessory member being configured to dock within the roof rack member and configured to pivot when docked with the roof rack member, wherein the accessory member includes:
        a pair of pivots on either side for engaging within respective recesses of the roof rack member, and
        a body extending down between the pivots and which is configured to form a complementary fit with a space defined in the roof rack member; and securing means for securing the accessory member to the roof rack member.

2. A roof rack coupler as claimed in claim 1, wherein the accessory member is releasably fastenable to the accessory.

3. A roof rack coupler as claimed in claim 1, wherein the accessory member can be dropped within and lifted out of the roof rack member to facilitate rapid assembly and disassembly.

4. A roof rack coupler as claimed in claim 1, wherein the accessory member can be substantially received within the roof rack member to provide a streamlined coupler when remaining on the roof rack during transport.

5. A roof rack coupler as claimed in claim 1, wherein the securing means includes a pin for being received by the members.

6. A roof rack coupler as claimed in claim 5, further including a lock for locking the pin and members together.

7. A roof rack coupler as claimed in claim 1, wherein the roof rack member defines one or more slotted fastening holes for adjustable fastening to the roof rack.

8. A roof rack coupler as claimed in claim 1, further including fasteners for fastening the roof rack member to the roof rack and the accessory member to the accessory.

9. A roof rack coupler as claimed in claim 1, further including a cover for covering the roof rack member when the accessory member is not engaged.

10. A roof rack coupler as claimed in claim 1, wherein the accessory is an awning or storage tube.

11. A roof rack coupler as claimed in claim 1, wherein further including another accessory such as a power supply for awning lighting for fastening the roof rack member.

12. A roof rack coupler as claimed in claim 1, being aerodynamic in shape with each member having rounded edges.

13. A roof rack coupler as claimed in claim 1, wherein the members are integrally formed.

14. A roof rack coupler as claimed in claim 13, wherein the members are injection molded.

15. A roof rack coupler as claimed in claim 13, wherein the members are formed from plastic or polymeric material.

16. A shelter including:
    accessory members coupled to an awning of the shelter and configured to releasably fasten to a roof rack bracket on a vehicle so that the shelter remains erected whilst using the vehicle bearing the roof rack bracket elsewhere; and
    one or more posts for supporting the accessory members, wherein the roof rack bracket is coupled to a roof rack member, and
    wherein each accessory member is configured to dock within the roof rack member and is configured to pivot when docked with the roof rack member, and each accessory member includes:
        a pair of pivots on either side for engaging within respective recesses of the roof rack member, and
        a body extending down between the pivots and which is configured to form a complementary fit with a space defined in the roof rack member.

17. A method for coupling an accessory to a roof rack, the method involving:
    fastening a roof rack member to the roof rack;
    fastening an accessory member to the accessory, wherein the accessory member is configured to dock within the roof rack member and is configured to pivot when docked with the roof rack member, wherein the accessory member includes:
        a pair of pivots on either side for engaging within respective recesses of the roof rack member, and
        a body extending down between the pivots and which is configured to form a complementary fit with a space defined in the roof rack member; and securing the accessory member to the roof rack member.

* * * * *